United States Patent
Wübbels

(10) Patent No.: US 6,470,658 B1
(45) Date of Patent: Oct. 29, 2002

(54) AGRICULTURAL IMPLEMENT, IN PARTICULAR A MOWING MACHINE

(75) Inventor: Richard Wübbels, Rhede (DE)

(73) Assignee: Deere & Company, Moline, IL (US)

( * ) Notice: Subject to any disclaimer, the term of this patent is extended or adjusted under 35 U.S.C. 154(b) by 73 days.

(21) Appl. No.: 09/695,336

(22) Filed: Oct. 24, 2000

(30) Foreign Application Priority Data

Oct. 27, 1999 (DE) .......................................... 199 51 644

(51) Int. Cl.[7] .............................................. A01D 69/08
(52) U.S. Cl. ............................. 56/11.7; 464/17; 464/48
(58) Field of Search ............................... 464/17, 42–48; 56/11.3, 11.4, 11.5, 11.7, 13.5, 13.8; 192/113.1

(56) References Cited

U.S. PATENT DOCUMENTS

| | | | | |
|---|---|---|---|---|
| 1,953,510 A | * | 4/1934 | Schultz et al. | 464/47 |
| 2,618,136 A | * | 11/1952 | Wellauer | 464/48 |
| 2,872,794 A | * | 2/1959 | Slomer | 464/48 X |
| 2,909,258 A | * | 10/1959 | Lacroix, Jr. | 192/113.1 |
| 3,488,980 A | * | 1/1970 | Burrough | 464/46 X |
| 3,600,877 A | * | 8/1971 | McCrary et al. | 464/48 X |
| 5,129,497 A | * | 7/1992 | Kelley | 464/48 X |
| 5,749,208 A | * | 5/1998 | Wuebbels et al. | 56/11.3 X |

FOREIGN PATENT DOCUMENTS

| | | |
|---|---|---|
| EP | 0 057 807 | 8/1982 |
| EP | 1 096 163 A1 * | 5/2001 |
| FR | 1 191 235 | 10/1959 |
| FR | 2 488 775 | 2/1982 |

OTHER PUBLICATIONS

Database WPI, Section PQ, Week 199311 Derwent Publications Ltd., London, GB; Class Q63, AN 1993–092446 ZP002161013 & SU A 726 864 A (Refrig Equip Des Cons Techn Inst) Apr. 15, 1992.

* cited by examiner

Primary Examiner—Greg Binda

(57) ABSTRACT

A self-propelled forage harvester has a relatively wide mowing implement attached to its forward end and including right and left hand rotary mowing and drawing in drums together with right and left hand rotary conveying drums. A drive transmission for driving these drums includes a pair of identical slip clutches having respective first sections defined in principal part by a fluid tight cylindrical container having opposite end plates and through the respective centers of which a drive element extends, with the drive element of one clutch being coupled to the drive element of the other clutch by a central drive shaft assembly. The clutches include respective second sections which are in the form of a housing which has a ring-like hub at one end adapted for being coupled to an associated right-angle transmission unit that is in turn coupled for driving the mowing and drawing in drums at that side. The first and second sections of each clutch are drivingly interconnected by a pair of friction disks mounted for rotation with the second section and respectively biased into friction locked engagement with the opposite end plates forming part of the container by a spring assembly mounted in an end of the housing remote from the ring-like hub.

8 Claims, 3 Drawing Sheets

AGRICULTURAL IMPLEMENT, IN PARTICULAR A MOWING MACHINE

The invention concerns an agricultural implement for attachment to a tractor or similar self-propelled vehicle, in particular a mowing machine for the mowing of grass, cereal or other grain crops.

BACKGROUND OF THE INVENTION

In the course of rationalization of the harvesting operation, agricultural implements with large operating widths are applied in conjunction with correspondingly high powered tractors. This applies particularly to mowing machines, for the mowing of grass and other grain crops, such as, in particular, corn, that are applied as front attachment implements for a tractor equipped with a chopper. The rotating tools here consist of intake and mowing drums, with which the crop is mowed and subsequently conducted to the chopper. In this case the operating gearbox of the tractor that drives the drive arrangement for the intake and mowing drums is formed by the central gearbox or the mowing height gear box of the chopper. Such forage harvesters employ high-powered motors up to 500 PS (metric horsepower) where correspondingly high drive power must be applied to the intake and mowing drums that are employed as rotating tools, of which several may be arranged on both sides of the vertical longitudinal center plane of the machine. Since the intake and mowing arrangements operating as rotating tools form large masses that must be accelerated for the initial acceleration of the mower, the drive arrangement of the tools is equipped with at least one slipping clutch as initial acceleration clutch and simultaneously as a safety clutch by means of which the torque transmitted between the drive shaft on the part of the vehicle and the drive arrangement of the rotating tools is limited in a manner known in itself.

In practical application in operation of such large agricultural implements, it has been shown that the maximum torque that can be transmitted by the slipping clutch during initial acceleration of the machine is frequently exceeded, if the initial acceleration on the part of the tractor is performed with a wide open throttle, contrary to the operating instructions of the manufacturer of the machine, instead of gradually increasing the application of the accelerator or gas pedal. The slipping clutch then slips under certain circumstances for several seconds before a friction locking is established through the spring-loaded, ring-shaped friction disks. During the slippage periods, large amounts of heat is generated in the slipping clutches, which are usually configured as dry clutches, that lead to overheating of the friction surfaces, in particular if the initial acceleration, if necessary, must be repeated several times. The forces that can be transmitted by the clutch components are thereby continuously reduced so that the clutch can become inoperative after only a relatively short operating time.

SUMMARY OF THE INVENTION

According to the present invention, there is provided an improved drive for a large mowing machine of the type described above.

An object of the invention is to provide a drive having improved initial acceleration characteristics which are applicable for use in harvesting operations in machines of the type indicated above.

A more specific object of the invention is to provide a drive embodying a slip clutch having a first section in the form of a hub configured as a ring-shaped container filled with fluid, with ring-shaped friction disks being engaged with end plates forming part of the container and mounted on a second clutch section for rotation with the second section which defines a housing surrounding the container, the fluid acting to absorb heat so that over-heating of the friction disks due to improper performance of the starting or initial acceleration process of the implement is largely avoided. The cooling fluid, such as water, contained in the ring-shaped container not only absorbs the heat generated by the clutching process, but conducts it to the surroundings over heat exchange surfaces provided by the ring-shaped container. In this way a considerable increase in the durability of the slip clutch is attained.

DESCRIPTION OF THE PREFERRED EMBODIMENT

Figure 1:
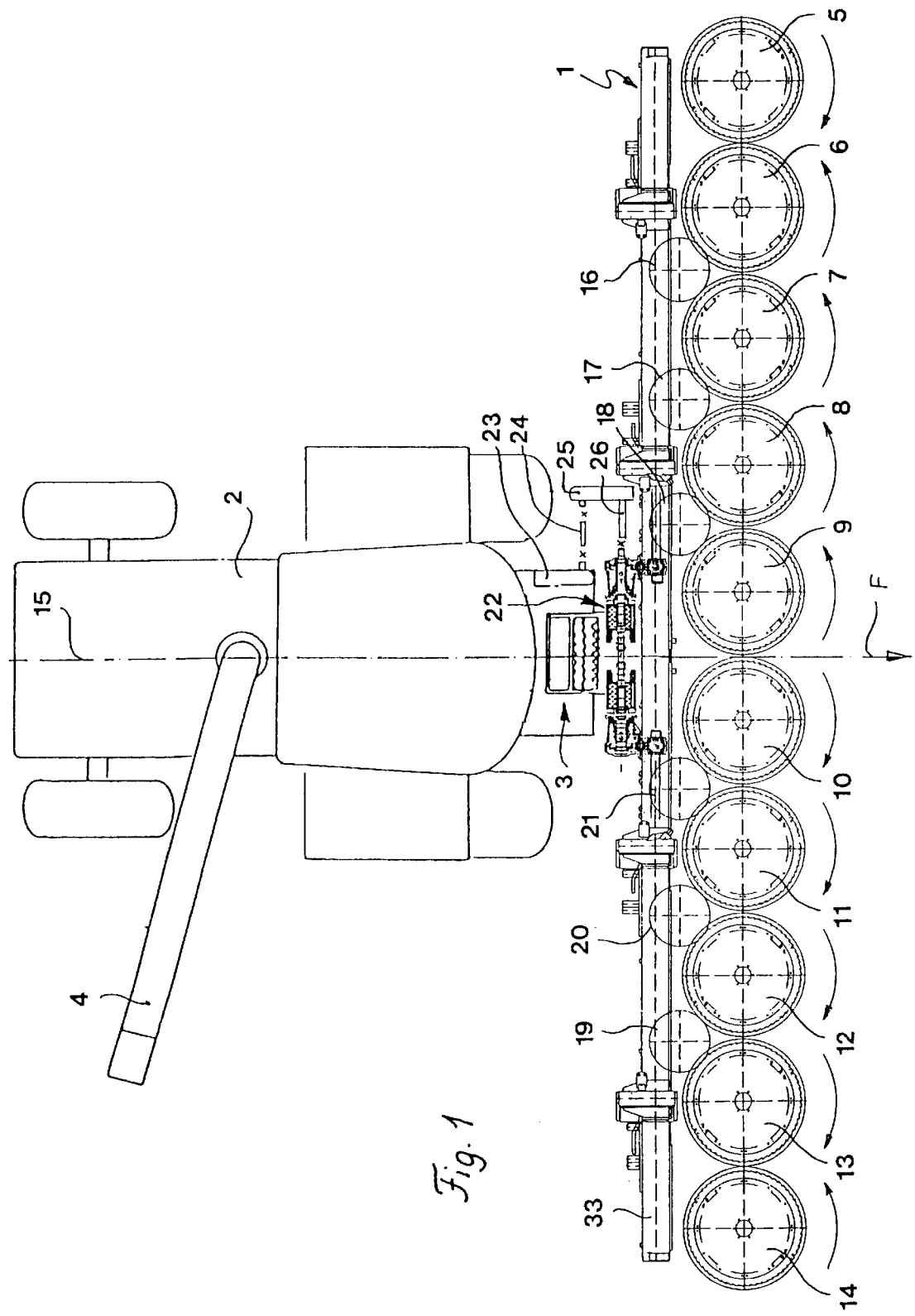
FIG. 1 is a plan view of a machine for mowing corn and similar stalk-like crop in connection with a chopper.

Referring now to FIG. 1, there is shown an agricultural implement in the form of a mowing implement or machine 1 attached to a tractor or similar self-propelled vehicle, here shown as a self-propelled forage harvester 2, for the mowing of corn and similar stalk-like crops. The forage harvester 2 includes a chopper 3 that is arranged centrally with respect to the mowing implement 1. The cut crop is conducted over intake rolls to a chopper blower, not shown in any further detail, in which it is chopped into short lengths and then conveyed over an exhaust duct 4 to a mobile container such as an agricultural self-loading forage box, for example.

The mowing machine 1, is moved forward by the vehicle 2 in the direction of operation or driving according to the arrow F, and, in the embodiment shown, includes a total of ten rotating tools in the form of intake and mowing drums 5 through 14, respectively, with the drums 5 through 9 being arranged at the left side of a vertical, longitudinal center plane 15 of the machine, and the drums 10 through 14 being arranged at the right side of the center plane 15. The two groups of intake and mowing drums 5 through 9, on the one hand, and 10 through 14, on the other hand, are arranged in a mirror image symmetrically about the longitudinal center plane 15. In addition, further conveyor drums 16,17 and 18 are located behind the neighboring intake and mowing drums 6 through 9 for further conveying of the crop cut by these drums and the drum 5 as well, while further conveyor drums 19, 20 and 21 are located behind the neighboring intake and mowing 10 through 13, for further handling of the crop cut by these drums and the drum 14 as well.

For driving the rotary tools in the form of the intake and mowing drums 5 through 14 as well as the conveying drums 16 through 21, the mowing machine 1 is equipped with a drive arrangement, designated in its entirety by the numeral 22, coupled to a gearbox 23 on the part of the vehicle that, in the embodiment shown, is formed by the central or mowing height gearbox of the chopper 3. From the operating gearbox 23, the drive is transmitted over an articulated shaft 24 to a gearbox 25 and from this over an articulated shaft 26 to the drive arrangement 22.

Figure 2:
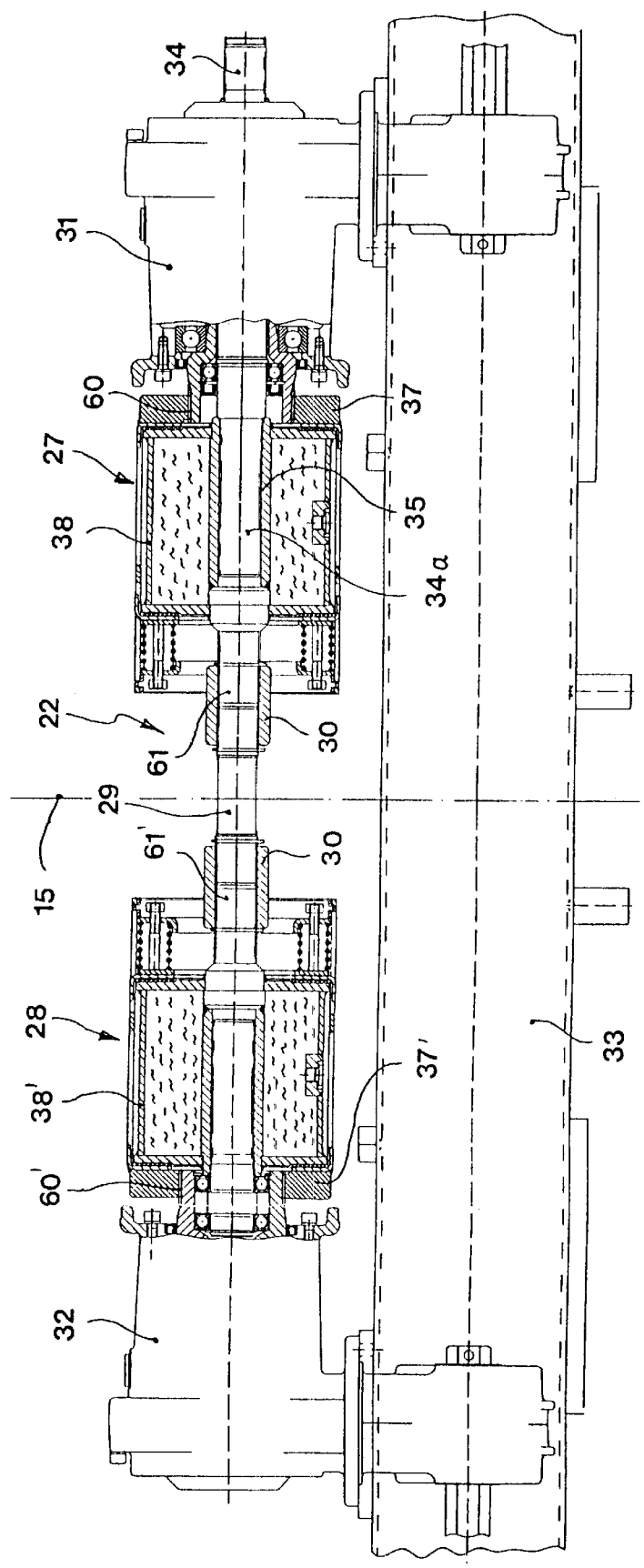
FIG. 2 is an enlarged, partial section of a plan view of the region of the drive arrangement of the mowing machine of FIG. 1.

In the embodiment shown, the drive arrangement 22 includes a clutch arrangement acting as a safety device while transferring torque during initial acceleration, the clutch arrangement being in the form of two clutches 27 and 28 that are rigidly connected with each other over a connecting shaft 29 with sleeve couplings 30. The two clutches 27 and 28 are configured identically and are arranged as mirror images symmetrically to each other on opposite sides of the vertical longitudinal center plane 15. The clutches 27 and 28 are respectively connected with angled gear boxes 31 and 32 that transmit the drive taken from the tractor 2 to respective shaft drive-lines (not shown) supported in bearings, free to rotate, in a frame tube 33 for the drive of the left half of the machine with the intake and mowing drums 5 through 9, or the right half of the machine with the intake and mowing drums 10 through 14. For its part, the frame tube 33 is fastened to a base frame of the mowing machine 1 in a manner not shown in any further detail. Furthermore, as can be seen in FIG. 2, a shaft section 34 of the articulated shaft 26 continues through the gear box 31 and extends at 34a into the clutch 27 in which it is retained by a multi-edge connection 35 with an axial play for movement.

Since the two clutches 27 and 28 are identical in design, their configuration shall be explained in greater detail below only on the basis of the clutch 27 together with the enlarged view in FIG. 3. Accordingly, the clutch 27 includes a first section defining a first clutch hub configured as a container 38 enclosed on all sides that includes an inner sleeve 39 providing a hub opening 36 that accepts the stub shaft 34a of the drive shaft section 34 on the part of the vehicle introduced into the clutch 27. The container 38 also includes an outer sleeve or cylindrical wall 40 that is joined to opposite end plates 43 and 44 so as to define an annular, space 41, that is filled with cooling fluid, such as water, and is closed on all sides except for a fill opening provided in the outer sleeve 40, which opening is closed after completion of the filling process by a threaded plug 42 with a sealing ring so that the space 41 is fluid tight.

The clutch 27 further includes a second section in the form of a clutch housing 37 including an end plate or hub 58 having an opening 59 provided with internal splines or a multi-wedge connection 60 through which the drive connection to the angled gearbox 31 is made for driving the rotary tools on that side of the vehicle.

Respectively located on the outside of the end faces 43 and 44 of the container 38 are ring-shaped or annular friction disks 45 and 46 that are respectively rigidly connected with ring-shaped or annular driver disks or backing plates 47 and 48. The rigid connection of the ring-shaped disks 45 and 46 with the ring-shaped driver disks 47 and 48 can be performed by mechanical connecting links, by bonding, by spraying with friction disk material or any other appropriate manner. The clutch housing 37 is configured so as to define a cylindrical enclosure 50 that encompasses the container 38. Guide sockets or tabs 49 form part of and are angled at right angles from the remaining portions of the disks 47 and 48 and are retained in circumferential guide slots provided in the cylindrical enclosure 50 so as to extend parallel to the axis of rotation and to provide axial play for the disks 47 and 48. Otherwise, the sleeve enclosure 50 is configured as a grating with openings 51, that improve the dissipation of heat from the ring-shaped container 38.

The friction disks 45 and 46 are spring loaded for effecting a drive connection that is a function of the torque between the ring-shaped container 38 forming the clutch hub and the clutch housing 37. This spring loading is provided by a ring-shaped spring package 52, inserted into the clutch housing 37, which consists of a ring of individual helical compression springs 53 whose line of force is parallel to a rotational axis R of the clutch. The ring of springs 53 are supported at their opposite end faces respectively by retaining rings 54 and 55, with the ring 54 bearing against the friction disk drive plate 48.

The compression of the compression springs 53 and thereby the maximum torque controlled by the contact pressure of the friction disks 45 and 46 at which the clutch 27 slips is adjusted by an adjustment ring 56 that is provided with detent cams 57 for a locking engagement in aperture openings of the clutch housing 37. Here, two or several rings and aperture openings are preferably provided that are spaced from one another in the direction of the clutch axis R, that are spaced for their part in the circumferential direction corresponding to the detent cams 57 of the adjustment ring 56. In the installed condition, the adjustment ring 56 is positioned with its inner end in contact with an outer face of the retaining ring 55, and thereby determines in the installed condition the pressure force, depending on which aperture opening engages a locking cam 57. As long as an adjustment of the torque through the package of compression springs 52 can be omitted, obviously a single ring of aperture openings in the clutch housing 37 would be sufficient for the locking of the adjustment ring 56.

The end plate or hub 58 of the housing 37 is located on the opposite end of the housing from the adjustment ring 56 and, together with the end plate 43 of the container 38, sandwiches the backing plate 47 with the friction disk 45. With the container 38 being mounted for shifting axially relative to the housing 37, the force exerted by the compression springs 52 acts to establish the predetermined force of frictional engagement between the friction disk 45 and the container end plate 43.

At its end opposite the introduction opening for the stub drive shaft 34a, the inner sleeve 39 is rigidly connected, for example welded to a coaxial stub shaft 61. Furthermore, the stub shaft 61 is rigidly connected or welded to the end face 44 of the ring-shaped container 38. The same goes for the end face 43 with respect to the inner sleeve 39. The stub shaft 61 extends through the spring package 52 to the connecting shaft 29, with which it is connected over the sleeve coupling 30. The connection with sleeve coupling 30 is again performed by a multi-wedge or spline connection.

Figure 3:
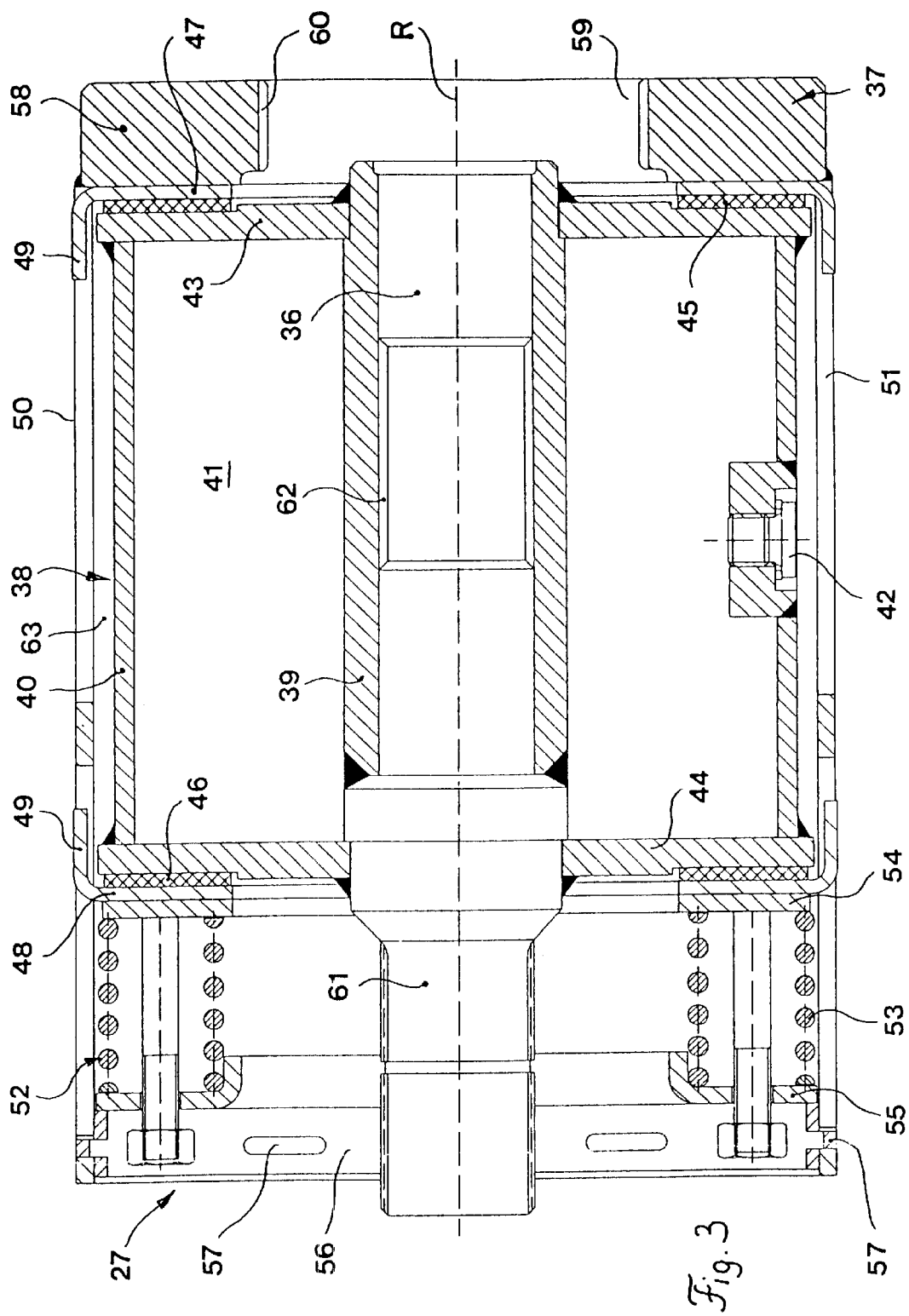
FIG. 3 is an enlarged, axial sectional view through a detail of the drive arrangement according to FIG. 2.

Furthermore, an arrangement of the grooves and ribs 62 can be seen in FIG. 3 that is limited to the central region of the sleeve bore 36 which is configured for the multi-wedge connection 35 (FIG. 2) with the correspondingly configured stub shaft 34a of the shaft section 34.

When the arrangement is coupled, the power flows over the spring loaded friction disks 45 and 46 from the ring-shaped container 38, set into rotation by the drive shaft section 34, to the clutch housing 37, in particular, the end face or hub 58 whose rotational movement is transmitted in turn through the multi-wedge connection 60 to the gearbox 31. Here the rotational drive is transmitted simultaneously over the stub shaft 61 to the connecting shaft 29 and from there over the stub shaft 61', that corresponds to the stub shaft 61, to the ring-shaped container 38' and the clutch housing 37' of the clutch 28 over the multi-wedge connection 60' to the angled gearbox 32.

If during the operation of the clutch 27, the predetermined torque is exceeded, then the clutch slips, and a relative rotational movement occurs between the clutch housing 37 and the ring-shaped container 38 with sliding friction at the interface between the ring-shaped disks 45 and 46 and the end face walls 43 and 44, respectively, of the ring-shaped container 38. The relative rotational movement is made possible by the clutch housing 37 with its sleeve enclosure 50 that concentrically surrounds and is spaced from the ring-shaped container 38 so as to leave a circumferential ring shaped void 63. It will be appreciated that heat generated at the interface of the clutch friction disks 45 and 46 and the container end faces 43 and 44 will be dissipated by the liquid coolant carried inside the container 38. Further, the various slots or openings 51 in the enclosure 50 also help in the dissipation of heat generated when the clutch 27 slips.

I claim:

1. In an agricultural implement including at least one rotary driven tool, a drive coupled to said rotary driven tool including a slip clutch, the improvement comprising:

said slip clutch including first and second sections arranged concentrically to and adapted for rotation about an axis;

said first section including a fluid tight container adapted for containing a liquid coolant and having at least one end plate;

a friction disk mounted to said second section for rotation therewith and for movement toward and away from said at least one end plate;

a biasing arrangement mounted to said second section for rotation with said friction disc and being mounted for yieldably frictionally locking said friction disk in engagement with said at least one end plate with a predetermined axial force, whereby when said clutch is overloaded said friction disk and said at least one end plate will rotate relative to each other and will generate heat that is dissipated by said liquid coolant.

2. The agricultural implement defined in claim 1 wherein said second section includes a wall spaced radially outward from, and extending about, said fluid tight container to thereby form an annular space between said fluid tight container and said wall so as to aid in heat dissipation.

3. The agricultural implement defined in claim 2 wherein the mounting of said friction disk to said second section includes a disk-like backing plate fixed to said friction disk and having axially extending tabs at its periphery; and said wall being provided with axial slots receiving said tabs for permitting the backing plate, and hence said friction disk, to move axially but not rotationally relative to said wall.

4. The agricultural implement defined in claim 1 wherein said fluid tight container has opposite ends defining said at least one end plate and a second end plate and said second section having a second friction disc mounted thereto for rotation therewith while fixing it axially at a location engaged with said second end plate; and said first section being mounted for axial movement toward and away from said second section, whereby said biasing arrangement also maintains a locking engagement of said second friction disc with said second end plate with a predetermined axial force.

5. The agricultural implement defined in claim 4 wherein said second section includes a hub at one end which defines an annular surface facing toward said second end plate;

said mounting of said at least one and second friction disks respectively including first and second disk-like backing plates each being provided with axially extending tabs at its respective periphery;

said second section having a wall spaced radially outward from, and extending about, said fluid tight container so as to define an annular space between said wall and said container; and said wall being provided with axially extending slots receiving said tabs for axial movement therein but so as to prevent relative rotational movement of said backing plates.

6. The agricultural implement as defined in claim 5 wherein said second friction disk and said second backing plate are sandwiched between said second endplate and said hub.

7. The agricultural implement as defined in claim 1 and including a second rotary driven tool adapted for being driven separately from said first-named rotary driven tool;

a second drive coupled for driving said second rotary driven tool and including a second slip clutch identical in construction to said first-mentioned slip clutch; and a drive shaft arrangement extending axially through said first-named and second slip clutches and including respective drive connections with said first clutch sections of said first-named and second slip clutches, with said first clutch sections respectively being coupled for driving said second clutch sections of said first-named and second slip clutches through said at least one friction disk of each clutch.

8. The agricultural implement as defined in claim 7 wherein said first-named and second slip clutches are arranged in symmetrical fashion relative to a vertical center plane extending therebetween in perpendicular relationship to the axis of rotation of the clutches;

said second section of each of said clutches having a hub formed at one end;

the drive for the first-named rotary driven tool including a first angle drive having an input shaft arranged concentric to said drive shaft arrangement and coupled to said first angle drive; and the drive for said second rotary driven tool including a second angle drive having an input shaft arranged concentric to said drive shaft arrangement and coupled to said hub of said second section of said second clutch.

* * * * *

UNITED STATES PATENT AND TRADEMARK OFFICE
CERTIFICATE OF CORRECTION

PATENT NO.    : 6,470,658 B1
DATED         : October 29, 2002
INVENTOR(S)   : Richard Wubbels It is certified that error appears in the above-identified patent and that said Letters Patent is hereby corrected as shown below:

<u>Title page,</u>
Item [73], Assignee, "Deere & Company, Moline, IL (US)" should be replaced with
-- Maschinenfabrik Kemper GmbH & Co. KG,
  Postfach 1352
  D-48694 Stadtlohn,
  Germany --

Signed and Sealed this

Twenty-sixth Day of August, 2003

JAMES E. ROGAN
*Director of the United States Patent and Trademark Office*